US005609350A

United States Patent [19]
Chumley et al.

[11] Patent Number: 5,609,350
[45] Date of Patent: *Mar. 11, 1997

[54] MOTOR HOME TOWING AND CARRYING APPARATUS AND METHOD

[76] Inventors: William M. Chumley, 3303 Green Pond Rd.; Kenneth D. Chumley, 835 Lightwood Knot Rd., both of Woodruff, S.C. 29388

[*] Notice: The term of this patent shall not extend beyond the expiration date of Pat. No. 5,501,481.

[21] Appl. No.: 619,309

[22] Filed: Mar. 21, 1996

Related U.S. Application Data

[63] Continuation of Ser. No. 331,995, Oct. 31, 1994, Pat. No. 5,501,481.

[51] Int. Cl.$^6$ .............................. B60D 1/14; B62D 53/00
[52] U.S. Cl. .................. 280/476.1; 280/408; 280/494
[58] Field of Search .................. 280/476.1, 402, 280/408, 410, 480, 480.1, 491.1, 656, 781, 789, 403, 493, 494

[56] References Cited

U.S. PATENT DOCUMENTS

| 3,322,292 | 5/1967 | Bogh et al. | 280/476.1 X |
| 3,568,866 | 3/1971 | Black | 280/408 X |
| 4,504,075 | 3/1985 | Dawson | 280/408 X |
| 4,890,852 | 1/1990 | Chapman | 280/402 |
| 5,387,001 | 2/1995 | Hull et al. | 280/402 |
| 5,501,481 | 3/1996 | Chumley et al. | 280/476.1 |

*Primary Examiner*—Kevin Hurley
*Attorney, Agent, or Firm*—Ralph Bailey

[57] ABSTRACT

Apparatus for securement of an automobile to a motor home and for carrying articles thereon has a tow bar (A) for attachment on one end to the motor home, a connecting frame (B) supporting a carrier platform member (C) with provision of a pair of transversely spaced retractable wheels (D) together with a towing connection (E) carried by the connecting frame adjacent a rear of said platform member so as to limit horizontal movement of the automobile in respect to the connecting frame but permitting pivotal movement in a vertical plane during towing.

19 Claims, 6 Drawing Sheets

MOTOR HOME TOWING AND CARRYING APPARATUS AND METHOD

This application is a continuation of U.S. application Ser. No. 08/331,995, filed Oct. 31, 1994, which is now U.S. Pat. No. 5,501,481.

BACKGROUND OF THE INVENTION

This invention relates to apparatus for securing an automobile to a motor home, for carrying articles between the motor home and the automobile for towing behind the motor home, and for serving as a roadworthy trailer.

Tow bars in common use with motor homes for towing automobiles and the like have included a frame member having a suitable attachment means on one end for making a steering connection with the motor home about an upright axis. A variety of tow bars are in common use, some employing the usual ball hitch including a ball and socket connection while others use a variety of connecting means including those employing an upright pin such as a pintle hitch. Whether the frame member may be an A-frame or a single bar, a towing connection is provided at the rear of the tow bar for securing the automobile against substantial pivotal movement with respect to the rear end of the tow bar but permitting vertical pivotal movement about a horizontal axis. Such tow bars vary in complexity from those employing a simple rigid frame to those having a frame of the collapsible or extensible types. The transportation of the wide variety of articles used by motor home enthusiasts presents a problem because many bulky items are often included which the owners of motor homes would prefer not to store on top of or inside the motor home during transport. Such articles may include bicycles, motor bikes, mopeds, motorcycles, all terrain vehicles (ATV's), camping equipment, etc. It is also desirable to carry even more bulky items such as golf carts and the like.

Another problem in connection with the use of prior art tow bars results from instability of the towed vehicle impairing the stability of entire assemblage. Sometimes, due to the forward positioning of the rear wheels of the motor home for weight distribution purposes, a tow bar may result in the towed vehicle being swung too far out on the turning arc due to the distance between the wheels and the vehicle resulting in less than ideal tracking.

Moreover, it is necessary to lift the tow to elevated position manually to the proper levels for effecting sequential connections to the motor home and to the towed vehicle.

The following patents contain disclosures which are illustrative of the state of the art: U.S. Pat. Nos. 2,523,210, 3,036,856, 3,214,047, 3,282,603, 3,348,859, 3,797,850, 4,109,811, 4,230,340, 5,137,297 and 5,256,024.

SUMMARY OF THE INVENTION

Accordingly, it is an important object of this invention to provide a carrier between a motor home and a towed vehicle utilizing a connecting frame extending rearwardly from and fixed to a tow bar for supporting a carrier as well as a towing connection for the automotive vehicle.

Another important object of the invention is the provision of a carrier in combination with a tow bar including an extension of the tow bar for carrying a variety of articles between the motor home and vehicle for avoiding the necessity of storing articles in and on top of the motor home during transport.

Another important object of the invention is the provision of an extended towing apparatus which improves stability of the assemblage of the motor home and towed vehicle, providing better tracking and greater visibility of the towed vehicle to the driver of the motor home.

Another important object of the invention is the provision of a trailer which may be utilized for towing articles behind a motor home but which has retractable wheels which may be raised after connecting a tow bar at a front end to the rear of the motor home providing a roadworthy trailer having a towing connection at the rear of a carrier platform member for connection when towing a vehicle.

It has been found that a connecting frame may be fastened adjacent a rear portion of a tow bar with a carrier platform member supported in superposed relation thereto, and a towing connection for an automobile carried adjacent a rear end of the carrier platform member so as to avoid the necessity for storing articles in the motor home vehicle while providing a more roadworthy assemblage of motor home and vehicle towed thereby. Moreover, hooking up of the assemblage is facilitated by the provision of wheels which may be retracted during towing or which provide a roadworthy trailer when a vehicle is not to be towed.

BRIEF DESCRIPTION OF THE DRAWINGS

The construction designed to carry out the invention will be hereinafter described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The drawings illustrate apparatus for securement of an automobile to a motor home and for carrying articles between a motor home and an automobile for towing behind the motor home. A tow bar A has an attachment device on one end for making a steering connection to the motor home pivoted about an upright axis permitting movement of the tow bar in a substantially horizontal plane about such axis. A connecting frame B is fastened adjacent a forward end to a rear portion of the tow bar. A carrier platform member C includes a flat support surface carried by the connecting frame in superposed relation thereto so that the tow bar positions a forward end of the carrier platform member adjacent the motor home. A transversely spaced pair of retractable wheels D are provided for supporting the carrier platform member. A towing connection E is carried by the connecting frame adjacent a rear end of the carrier platform member for securement of the automobile for towing. The towing connection includes a substantially horizontal transverse pivotal connection for securement to the automobile substantially fixing the automobile against horizontal movement in respect to the connecting frame but permitting pivotal movement in a vertical plane during towing. Thus, a carrier platform member is positioned for hookup between a tow bar pivotally connected to the motor home and a towing connection to the automobile providing a carrier accessible for use avoiding storage of articles in the motor home and for stabilizing the motor home and automobile during towing.

Figure 1:
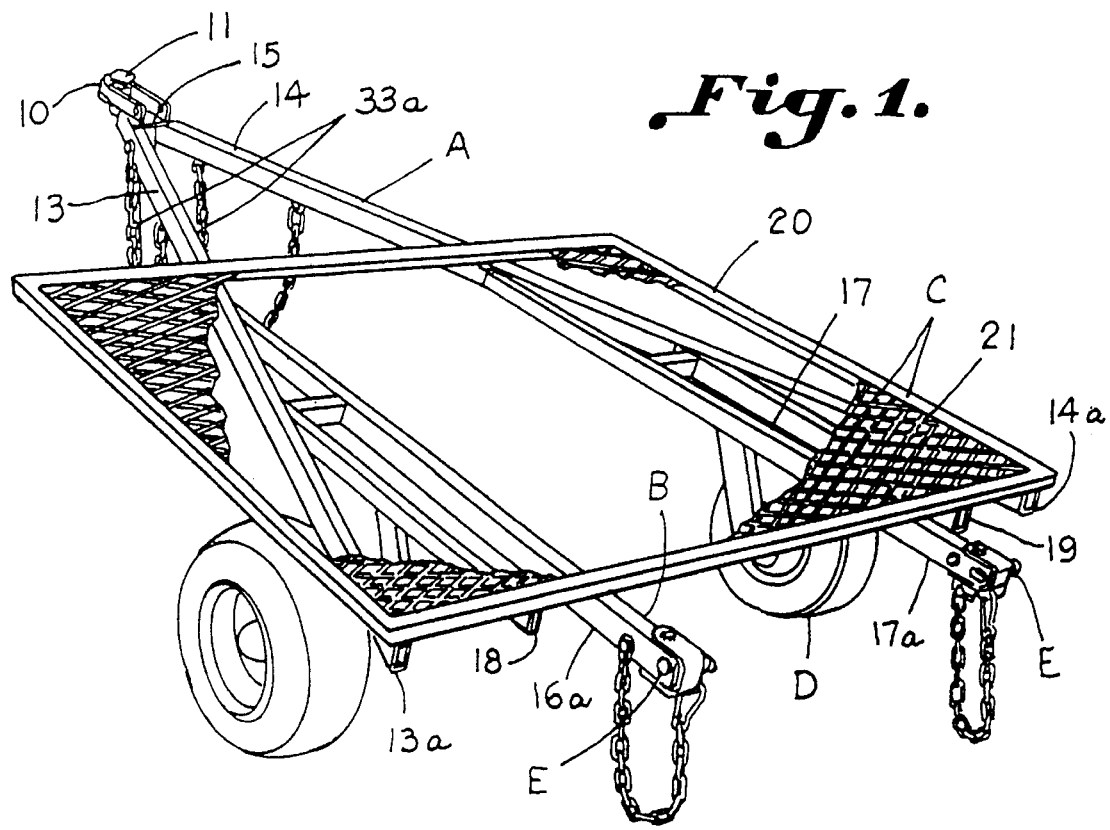
FIG. 1 is a perspective view illustrating an apparatus for securing an automobile to a motor home and for carrying articles therebetween during towing constructed in accordance with the present invention.
Figure 5:
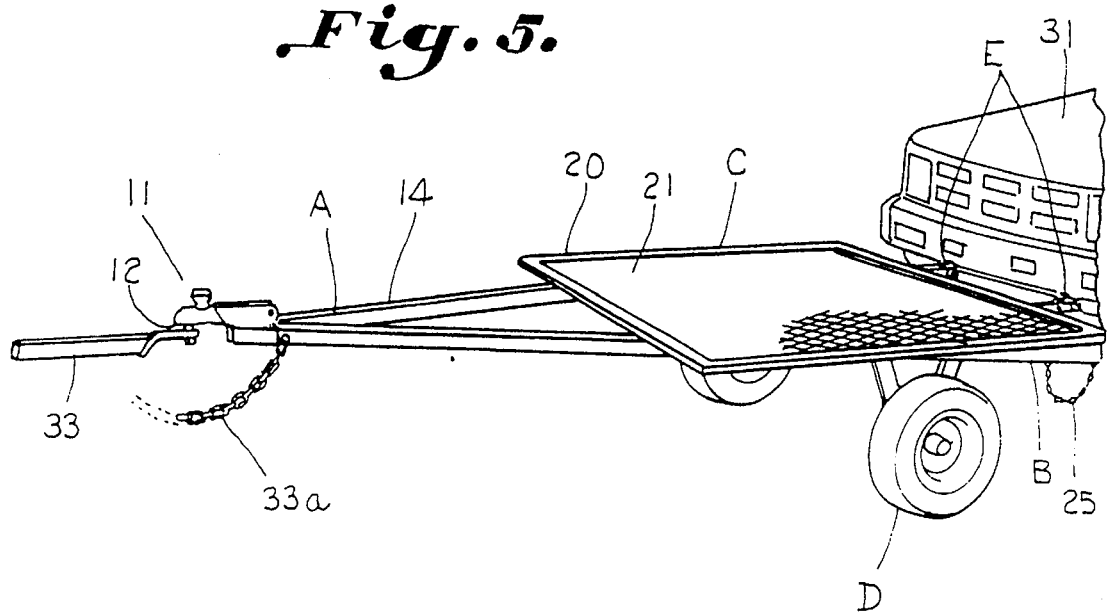
FIG. 5 is a perspective view illustrating apparatus constructed in accordance with the invention attached on one end to a ball carried by the motor home for securement to a socket carried at a forward end of a tow bar, together with a carrier in superposed relation to a connecting frame with securement thereof to the front frame of an automotive vehicle.

Referring more particularly to FIG. 1, a suitable attachment device making a pivotal steering connection to the automobile is illustrated in the form of a socket connection 10 provided with the usual clamping mechanism 11 for manually securing the socket in firm clamping engagement with a ball member 12 shown in FIG. 5. The tow bar is illustrated in the shape of an A-frame having diverging longitudinal frame members 13 and 14 secured at the forward end as by welding and the socket housing illustrated as at 15. The diverging frame members 13 and 14 extend rearwardly forming a connecting frame B which is integral with the tow bar. The connection between the tow bar A and the connecting frame B may be articulated as by a horizontal pivot pin or otherwise secured against horizontal movement.

The connecting frame includes the extension of the members 13 and 14 as at 13a and 14a. The connecting frame B further includes substantially parallel frame members 16 and 17 together with intermediate parallel support members 18 and 19 suitably secured as by welding to adjoining members to form a rigid frame. Transverse bracing members 18 and 19a may be provided and secured at their respective ends as by welding to adjoining frame members. It will be observed that the members 16 and 17 project outwardly as at 16a and 17a past a rear portion of the carrier platform C so as to provide a convenient location for the towing connection E.

The platform C includes a perimeter frame 20 and a flat support surface which may be provided by an expanded metal cover 21. The perimeter frame 20 may serve as a rear frame portion of the connecting frame B as illustrated wherein the perimeter frame is welded to intersecting portions of the members forming frame B or a separate rear frame member may be provided. The various members described above as constituted frame B are welded to form an integral rigid frame B and carrier platform C. Transversely aligned spaced wheels D are illustrated in a lowered position for acting as a trailer or for positioning the apparatus for towing between a motor home and a vehicle.

Figure 2:
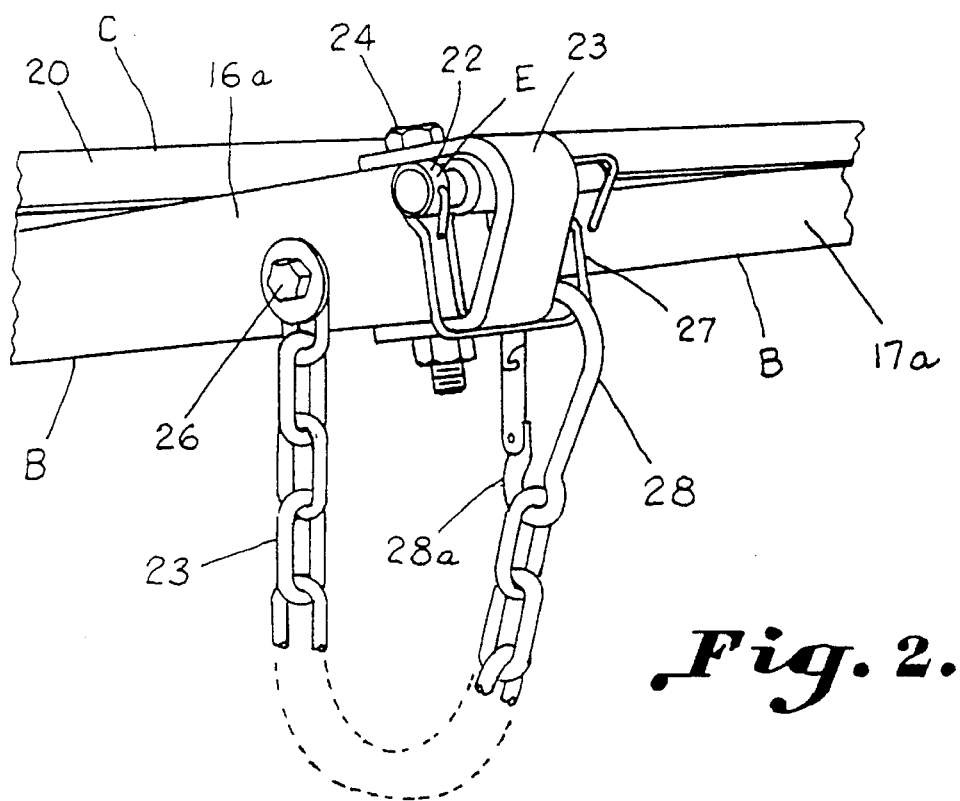
FIG. 2 is an enlarged perspective view of a towing connection for the automobile.

FIG. 2 is an enlarged perspective view showing details of the towing connection which is attached to rearward ends of the connecting frame members 16a and 17a. The towing connection E includes pins 22 carried by the frame members 16a and 17a respectively forming a transverse horizontal pivotal connection for the automotive vehicle. The pin is illustrated as being carried removably by brackets 23 which are removably connected as by bolts 24 to the respective frame members. The safety chains 25 are illustrated as being attached on one end as at 26 to the respective frame members and is shown suspended from a locking pin 27 for assuring securement of the respective pins 22 for securing the vehicle. When in running position, the safety chains are secured by fasteners 28 on respective free ends to suitable bolts in the frame of the vehicle being towed. The fastener has a pivoted latch 28a to facilitate attachment and to assure retention during towing.

Figure 3:
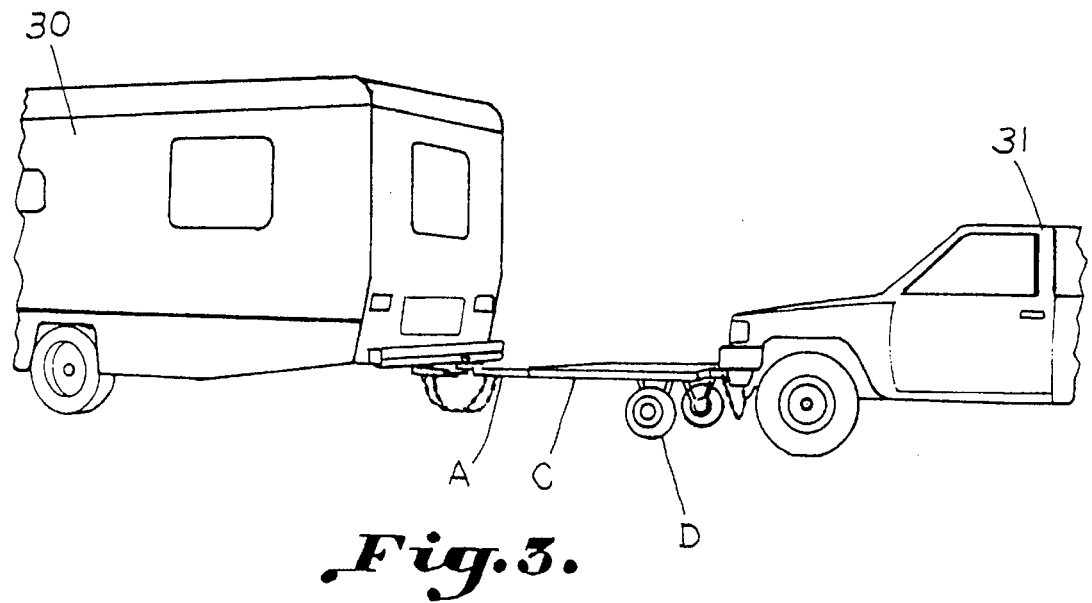
FIG. 3 is a perspective view illustrating an apparatus constructed in accordance with the present invention secured in towing relation between a motor home and a vehicle to be towed wherein transversely spaced wheels are in lowered position to facilitate attachment in the apparatus in towing position.
Figure 4:
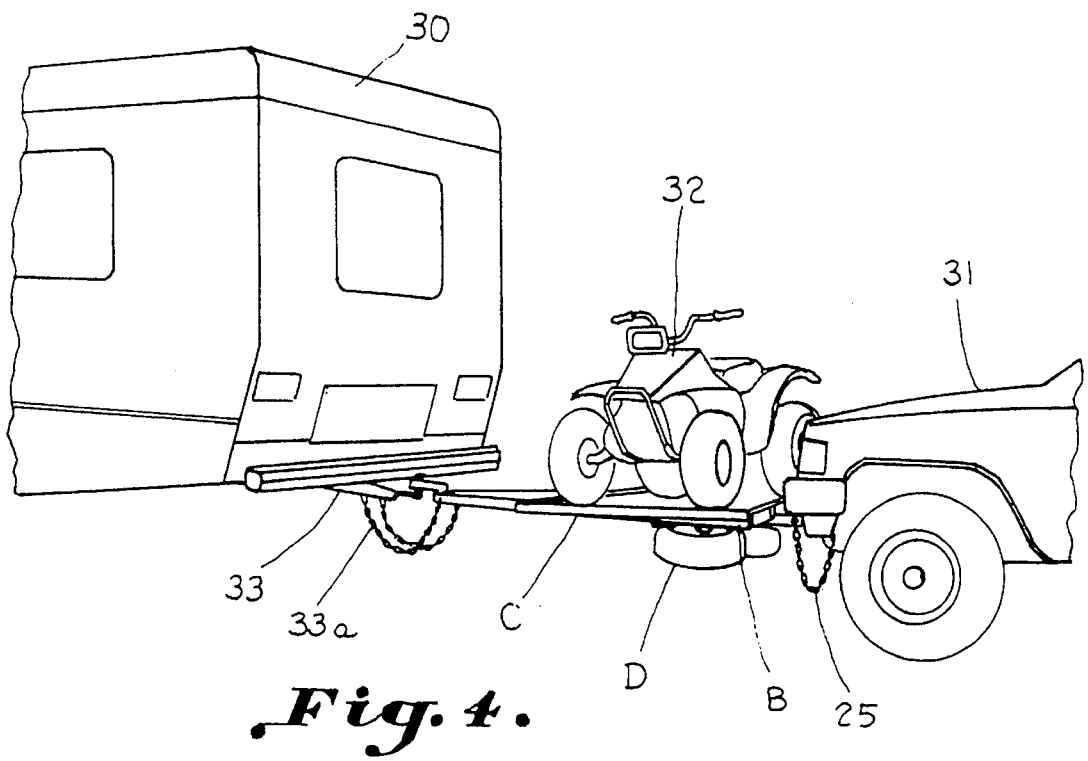
FIG. 4 is a perspective view illustrating apparatus constructed in accordance with the invention in towing position with the wheels retracted and with an ATV positioned on the platform preparatory to securement as with chains or other suitable fastening means for transport.
Figure 6:
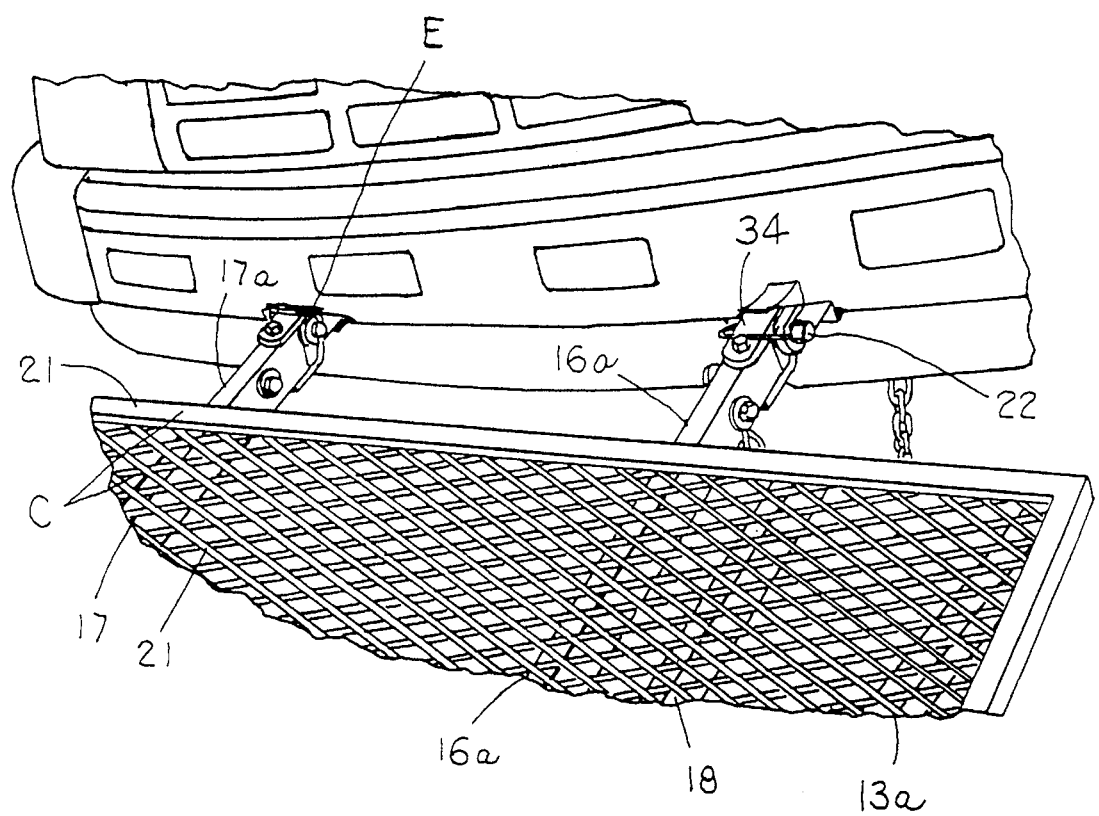
FIG. 6 is an enlarged perspective view illustrating a connection between the connecting frame and the frame of the automotive vehicle preparatory to towing.

FIGS. 3–6 further illustrate the mode of attachment of the apparatus for pivotal steering movement in a horizontal plane to a motor home 30 on one end and to an automotive vehicle illustrated at 31 on the other end. In FIG. 3 the carrier platform C is positioned upon the frame carried by the wheels D which are in lowered position to facilitate securement. FIG. 4 is an enlarged perspective view of the apparatus with the wheels D in a raised position and with the platform C carrying a load in the form of an ATV 32. FIG. 5 illustrates the carrier platform member C supported by the wheels D to facilitate fastening of the socket 11 to the ball 12 which is carried by the usual longitudinal axial support 33 which is suitably secured to the frame of the motor home. The usual safety chain is illustrated at 33a. FIG. 6 illustrates the use of the towing connection E for connection to a bracket 34 carried by the vehicle frame for inserting the pins 22 forming the transverse pivotal connection. The safety chain 25 is illustrated as extending beneath the bumper 35 of the towed vehicle for attachment to the frame of the towed vehicle.

Figure 7:
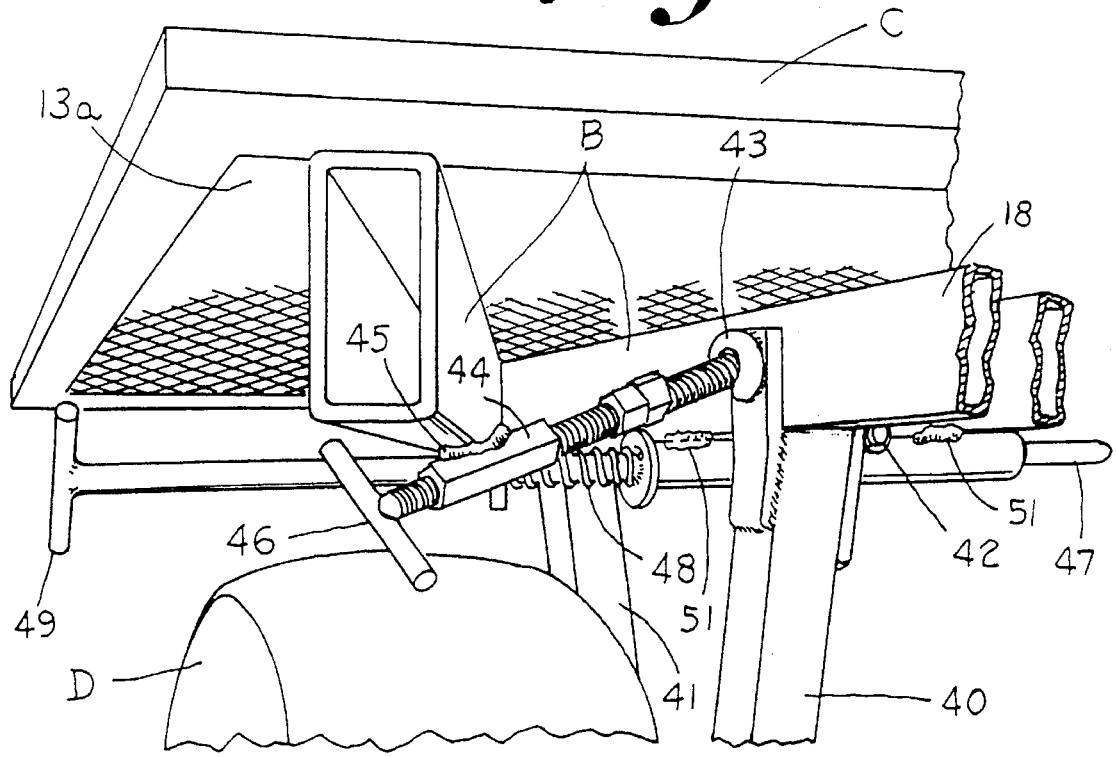
FIG. 7 is a perspective view looking beneath the connecting frame and carrier platform illustrating means for securing the pivotally connected wheels in a lowered position together with means securable for fastening the wheels pivoted inwardly in retracted raised position.
Figure 8:
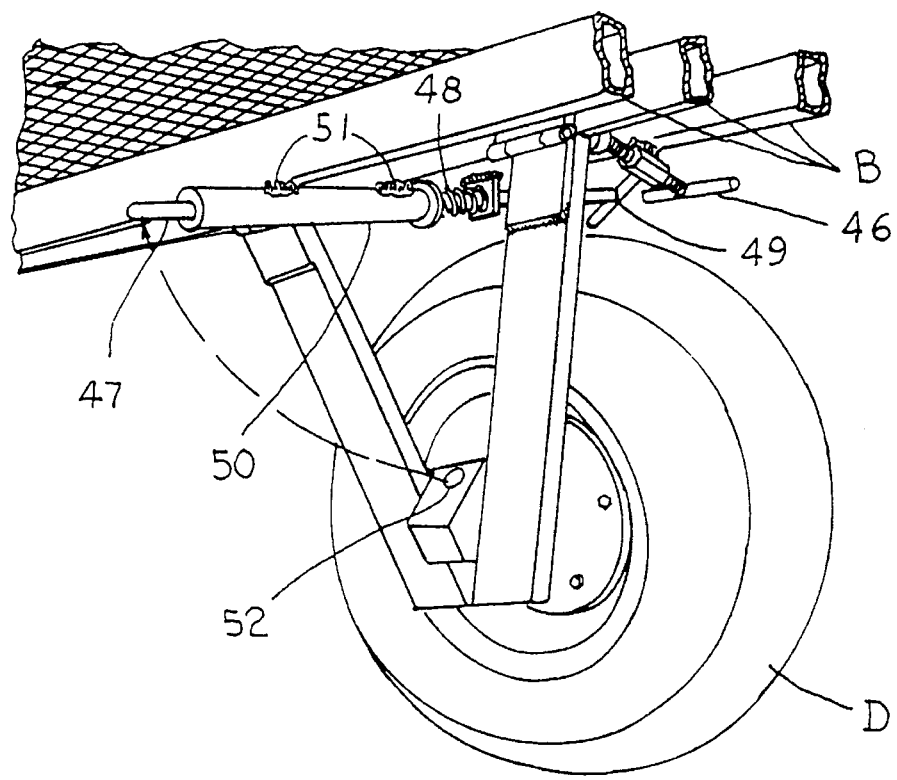
FIG. 8 is a perspective view looking beneath the connecting frame and carrier platform looking from the inside out further illustrating the means of securing the wheels in a lowered position and in an upward retracted position.

FIGS. 7 and 8 are perspective views illustrating means for retaining the wheels D in lowered position for facilitating attachment of the apparatus between the motor home and vehicle for towing or for acting as a roadworthy vehicle in the form of a cargo or utility trailer when the apparatus is not being utilized for towing. A wheel has a pair of support members 40 and 41 which are pivoted about horizontal longitudinal pivots as at 42. An upward extension 40a of the frame members 40 overlies the outside of the frame member 18 and carries a socket member 43 for receiving an end of a threaded member carried in an internally threaded member 44 welded as at 45 to the frame member 13a. By turning the handle 46 the threaded member may be urged to engagement within the socket 43 for positioning the wheels in locked lowered position forming a roadworthy trailer.

FIG. 8 illustrates a plunger 47 which is spring loaded as at 48 and manipulated by the handle 49 within a housing 50 welded as at 51 to the frame member B. The plunger 47 may be retracted against the force of the spring to permit full elevation or retraction of the respective wheels bringing a recessed receptacle 52 into position to receive the plunger 47 in locking position for maintaining the wheels in elevated retracted position.

Figure 9:
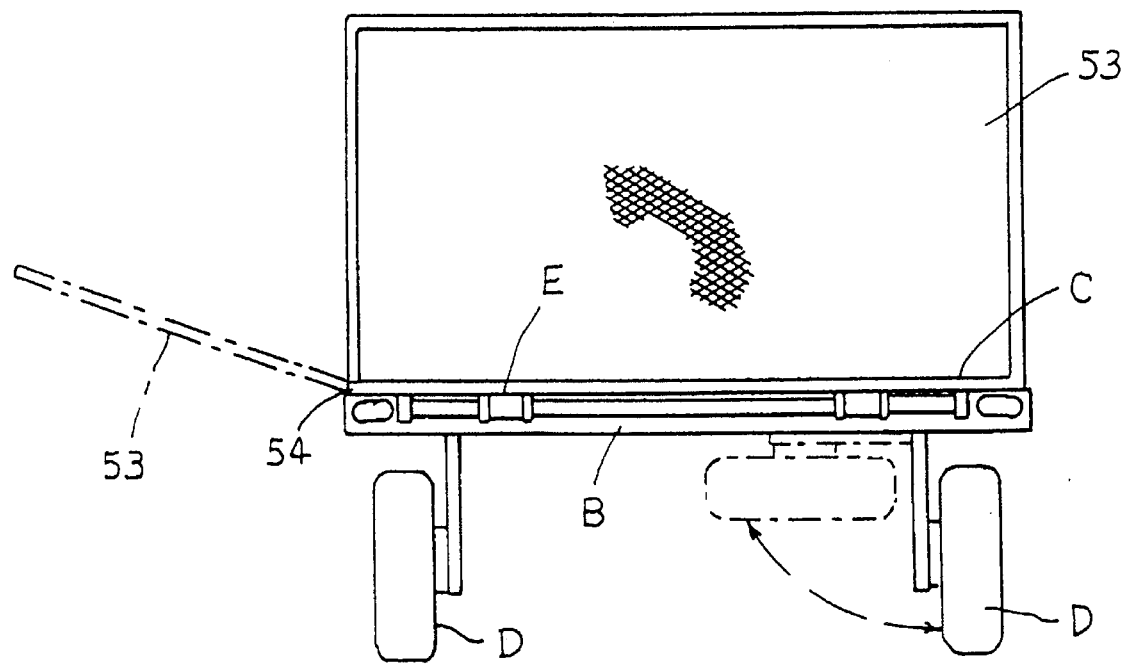
FIG. 9 is a rear elevational view, with parts omitted, illustrating downwardly pivotal sides for use with apparatus constructed in accordance with the present invention in order to facilitate carrying articles during transport.
Figure 10:
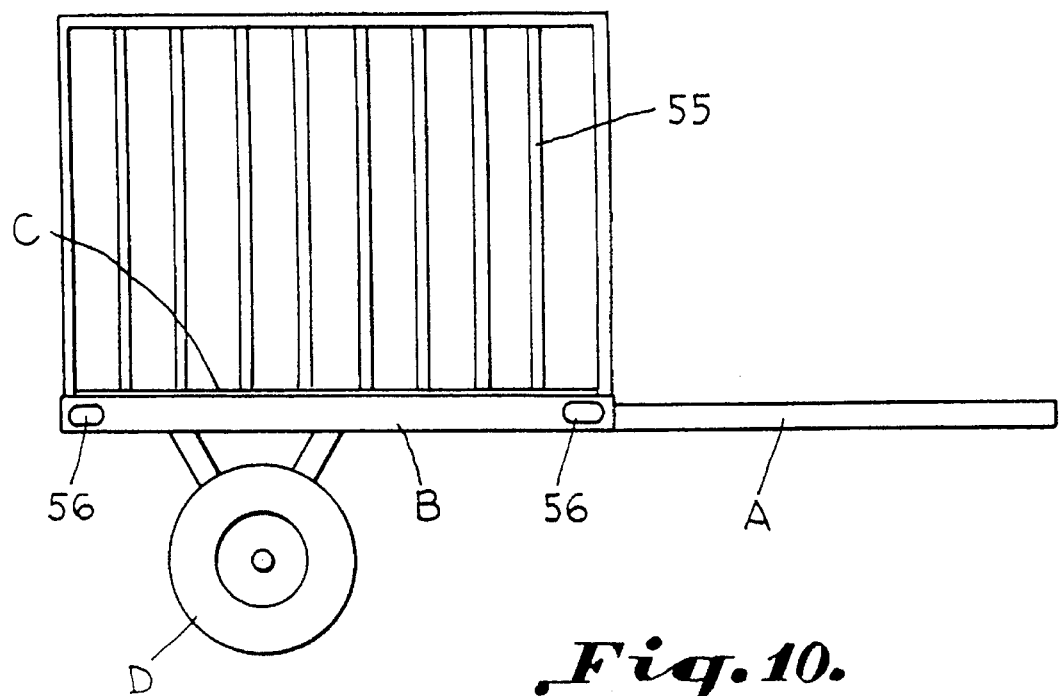
FIG. 10 is a side elevational view, with parts omitted, illustrating a modified form of the invention illustrated in FIG. 9 wherein a bicycle rack is employed in lieu of at least one of the side members.

FIG. 9 is a schematic rear elevation of the apparatus illustrating expanded metal sides 53 which may be pivoted upwardly and downwardly and bolted to the frame as at 54. FIG. 10 is a side elevation illustrating the use of a frame having vertical metal bars 55 providing a bike rack as an alternative to at least one of the expanded metal racks illustrated in FIG. 9. Suitable running lights are illustrated as at 56.

Figure 11:
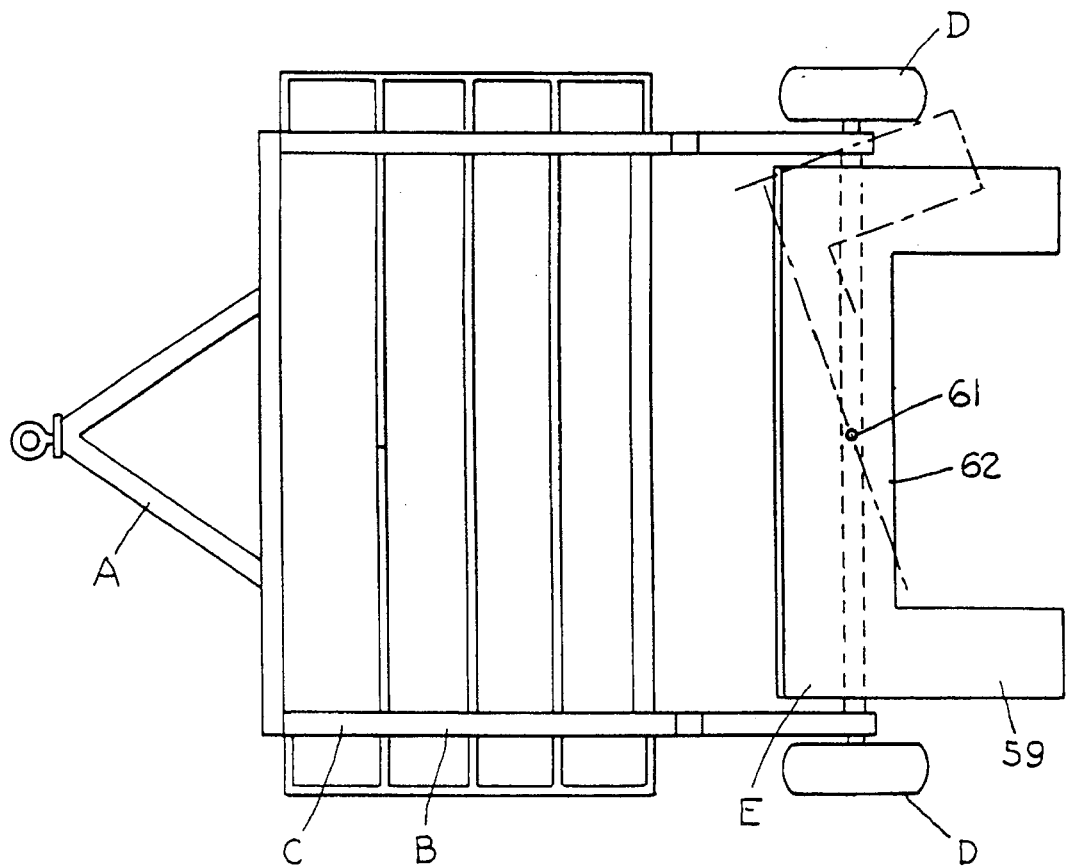
FIG. 11 is a schematic top plan view, with parts omitted, illustrating a modified form of the invention wherein a towing connection in the form of a dolly has an intermediate connecting frame for carrying a carrier platform between the motor home and the towed vehicle.
Figure 12:
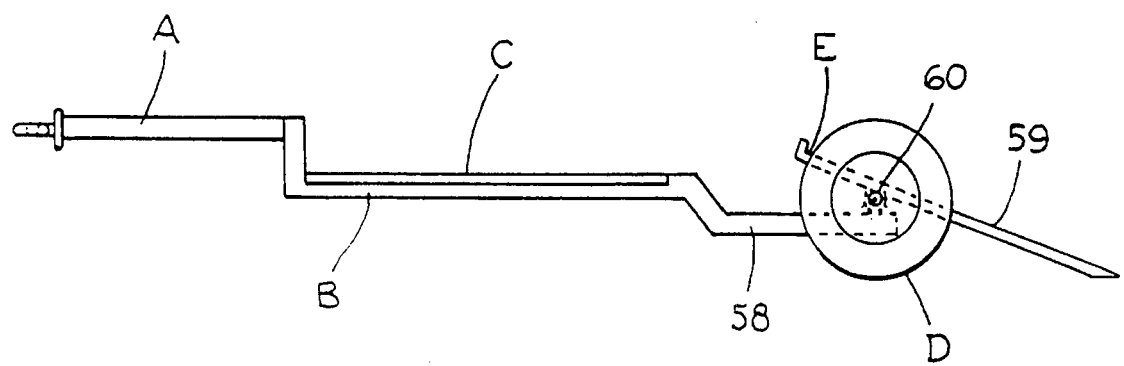
FIG. 12 is a schematic side elevation further illustrating the modified form of the invention including the dolly towing connection of FIG. 11.

FIGS. 11 and 12 illustrate a modified form of the invention wherein a dolly towing connection E is provided for receiving the front wheels of a vehicle for towing. Such a connection is necessary on some front drive vehicles in order to act as a proper towing connection. The dolly connection includes a slightly lowered extension of the frame B illustrated at 58 together with an inclined ramp 59 permitting the front wheels of the vehicle to be received thereon for proper alignment by a standard transverse pivot as shown at 60. A central vertical pivot is provided at 61 to permit limited pivotal movement in a horizontal plane of the platform which includes the member 59 and a transverse vertical pivotal member 62. The pivot 61 permits adjustment of the platform to properly receive the front wheels of a vehicle in alignment for towing after having been secured as by chains to the towing platform 62. Such a structure is amenable to heavy construction permitting the carrying of heavy loads such as golf carts. If desired, lateral ramps (not shown) may be provided to facilitate loading.

It is thus seen that a cargo carrying apparatus including a tow bar A and a connecting frame B supporting a carrier platform member C has provided for connecting an automotive vehicle to be towed to a motor home and the like. The connecting frame B is preferably rigidly integrally connected to the tow bar which has a pivotal connection to the motor home. A towing connection E is provided for hooking up the towed vehicle. The transversely spaced wheels D facilitate assembly of a motor home and an automobile by positioning the towing connection for easy securement to a front frame portion of the automobile. A vertical support strut, with or without a wheel, may be provided for this purpose. However, the spaced wheels D are also capable of converting the apparatus into a trailer when not engaged in towing. The automotive vehicle which is commonly towed for use for transportation after the motor home has arrived at its destination, whether truck, van, automobile and the like are referred to herein by the term automobile.

While a preferred embodiment of the invention has been described using specific terms, such description is for illustrative purposes only, and it is to be understood that changes and variations may be made without departing from the spirit or scope of the following claims.

What is claimed is:

1. Apparatus for securement of an automobile to a motor home and for carrying articles between the motor home and the automobile for towing behind the motor home comprising:

a tow bar having an attachment device on one end for making a steering connection to said motor home pivoted about an upright axis permitting movement of the tow bar in a substantially horizontal plane about said axis;

a connecting frame fastened against horizontal movement adjacent a forward end thereof to a rear portion of said tow bar;

a carrier platform member including a flat support surface carried by said connecting frame in superposed substantial alignment therewith so that said tow bar may position a forward end of said carrier platform member adjacent a rear end of said motor home;

a transversely spaced pair of wheels for supporting said carrier platform member for hookup of the apparatus for towing and supporting said carrier platform members for acting as a trailer;

a retracting device for facilitating raising of the wheels and locking the wheels during towing in raised out-of-the-way position;

a towing connection for said automobile carried by said connecting frame adjacent a rear end of said carrier platform member; and said towing connection including
      a substantially horizontal transverse pivotal connection for securement to said automobile substantially fixing said automobile against horizontal movement in respect to said connecting frame but permitting pivotal movement in a vertical plane during towing;
      whereby said carrier platform member is positioned between said tow bar and said towing connection providing a carrier accessible for use avoiding storage of articles in the motor home and for stabilizing the motor home and automobile during towing.

2. The structure set forth in claim 1 wherein said attachment device on said tow bar includes means for providing a pivotal connection about an upright member including a socket for receiving a ball connector.

3. The structure set forth in claim 1 wherein said transverse pivotal connection includes at least one removable transverse pin.

4. The structure set forth in claim 1 wherein said wheels are pivotally mounted for lateral movement raising them to a position wherein the wheels are folded up beneath the carrier, and said retracting device includes a locking member maintaining said wheels in lowered position but being manually releasable permitting raising of the wheels for towing, and a retaining member locking the wheels in raised position during towing.

5. The structure set forth in claim 1 including downwardly pivotal sides on said carrier platform.

6. The structure set forth in claim 1 including a bicycle rack on said carrier.

7. Apparatus for securement of an automobile to a motor home and for carrying articles between the motor home and the automobile for towing behind the motor home comprising:

a tow bar having an attachment device on one end for making a steering connection to said motor home pivoted about an upright axis permitting movement of the tow bar in a substantially horizontal plane about said axis;

a connecting frame fastened adjacent a forward end thereof to a rear portion of said tow bar;

a carrier platform member including a flat support surface carried by said connecting frame so that said tow bar may position a forward end of said carrier platform member adjacent said motor home;

a towing connection for said automobile carried by said connecting frame adjacent a rear end of said carrier platform member; and said towing connection including a substantially horizontal transverse pivotal connection for securement to said automobile substantially fixing said automobile against horizontal movement in respect thereto but permitting pivotal movement in a vertical plane during towing;

whereby said carrier platform member is positioned between said tow bar and said towing connection so that said carrier platform is positioned between said automobile and said motor home during towing, thus providing a carrier accessible for use avoiding storage of articles in the motor home and for stabilizing the motor home and automobile during towing.

8. The structure set forth in claim 7 including a transversely spaced pair of wheels for supporting said carrier platform member.

9. The structure set forth in claim 8 including a pivotal mounting on said frame, a first clamping member holding said wheels in extended position for running on the road and a second clamping member holding said vehicle in raised position when towing.

10. The structure set forth in claim 8 wherein said wheels are carried rearwardly of said carrier platform member on said connecting frame for supporting said frame and front wheels of an automobile serving as said towing connection.

11. The structure set forth in claim 10 wherein said towing connection includes a substantially horizontal transverse member disposed to receive and support the front wheels of a towed automobile off the ground, said transverse member having a vertical pivot with said connecting frame located transversely intermediate said wheels of the connecting frame for allowing the towed automobile to pivot in a horizontal plane relative to the connecting frame during cornering.

12. The structure set forth in claim 11 wherein said transverse member is swingable about a horizontal transverse axis into an inclined, ground-engaging, loading position.

13. The structure set forth in claim 7 wherein said substantially horizontal pivotal connection for securement to said automobile substantially fixes said automobile against horizontal movement in respect to said connecting frame but permits pivotal movement in a vertical plane during towing.

14. The method of securing an automobile to a motor home for towing behind the motor home and for carrying articles therebetween during towing comprising the steps of:

providing a tow bar having an attachment device on one end for making a single pivotal connection to said motor home permitting steering movement of the tow bar in a substantially horizontal plane;

positioning a carrier platform member having a flat support surface with a forward end thereof adjacent said tow bar;

fixing a connecting frame on a forward end to said tow bar for supporting said carrier platform member thereon adjacent a rear end of said motor home; and fastening a towing connection for said automobile adjacent a rear end of said carrier platform member supporting said carrier platform members by engaging means for providing a transverse connection carrying said automobile in transverse alignment during towing;

whereby said carrier platform member is positioned between said tow bar connected to said motor home in a single pivotal connection and said towing connection to said automobile by transverse engaging means providing a carrier surface between said motor home and said automobile accessible for storage use when connected for towing.

15. The method set forth in claim 14 including the step of providing a pair of transversely aligned wheels for facilitating supporting of the carrier platform for fastening said towing connection and providing a roadworthy carrier trailer when utilized without towing.

16. The method set forth in claim 15 including the step of retractably mounting said wheels on said frame beneath said carrier platform member.

17. The method set forth in claim 14 including the step of carrying wheels rearwardly of the carrier platform member providing a dolly supporting front wheels of said automobile providing said towing connection.

18. Apparatus for securement of an automobile to a motor home and for carrying articles between the motor home and the automobile for towing behind the motor home comprising:

a tow bar having an attachment device on one end for making a steering connection to said motor home pivoted about an upright axis permitting movement of the tow bar in a substantially horizontal plane about said axis;

a connecting frame fastened adjacent a forward end thereof to a rear portion of said tow bar;

a carrier platform member including a flat support surface carried by said connecting frame so that said tow bar positions a forward end of said carrier platform member adjacent said motor home;

at least one transversely spaced pair of wheels for supporting said carrier platform carried on said connecting frame; and a towing connection including a substantially horizontal transverse member that is horizontally pivotal on said connecting frame for securement to said automobile substantially fixing said automobile against horizontal movement in respect to the member but permitting pivotal movement of the automobile in vertical and horizontal planes relative to the connecting frame during towing;

whereby said carrier platform member is carried between said tow bar and said towing connection so that said carrier platform provides a carrier accessible for use avoiding storage of articles in the motor home and for stabilizing the motor home and automobile during towing.

19. The structure, set forth in claim 18 including a vertical pivotal connection between said horizontal transverse member and said connecting frame permitting limited pivotal movement in a horizontal plane facilitating positioning of the front wheels of said automobile on said horizontal transverse member for towing.

* * * * *